United States Patent [19]
O'Neal

[11] 4,238,910
[45] Dec. 16, 1980

[54] MOUNTING FOR INFLATABLE DOCK SEAL

[76] Inventor: Larry O'Neal, 4953 Timbercrest Dr., Canfield, Ohio 44406

[21] Appl. No.: 21,028

[22] Filed: Mar. 16, 1979

[51] Int. Cl.³ ............................................. E04B 1/34
[52] U.S. Cl. ..................................... 52/2; 52/173 DS
[58] Field of Search ............... 52/173 DS, 2; 151/27, 151/28; 403/DIG. 8, DIG. 4, 343, 49; 49/498, 477; 85/5 P, 32 W

[56] References Cited

U.S. PATENT DOCUMENTS

| | | | |
|---|---|---|---|
| 2,470,344 | 5/1949 | Dzus | 85/32 W X |
| 3,303,615 | 2/1967 | O'Neal | 52/2 |
| 3,391,502 | 7/1968 | O'Neal | 52/2 |
| 3,391,503 | 7/1968 | O'Neal | 52/2 |
| 3,588,968 | 6/1971 | Heilman | 85/5 P X |
| 3,714,745 | 2/1973 | O'Neal | 52/2 |
| 4,045,925 | 9/1977 | O'Neal | 52/2 |

*Primary Examiner*—Carl D. Friedman
*Attorney, Agent, or Firm*—Webster B. Harpman

[57] ABSTRACT

A mounting for an inflatable dock seal whichis used for closing the area around a dock opening in a wall with respect to a truck or a trailer arranges uninflated flexible tubular members on the several sections of the inflatable dock seal and positions structural members is the flexible tubular members. Access openings in the flexible tubular members permit the introduction of fastener assemblies secured to the wall about the dock opening to the quickly and easily engage openings in the structural members so as to position the inflatable dock seal on the wall about the dock opening therein.

3 Claims, 7 Drawing Figures

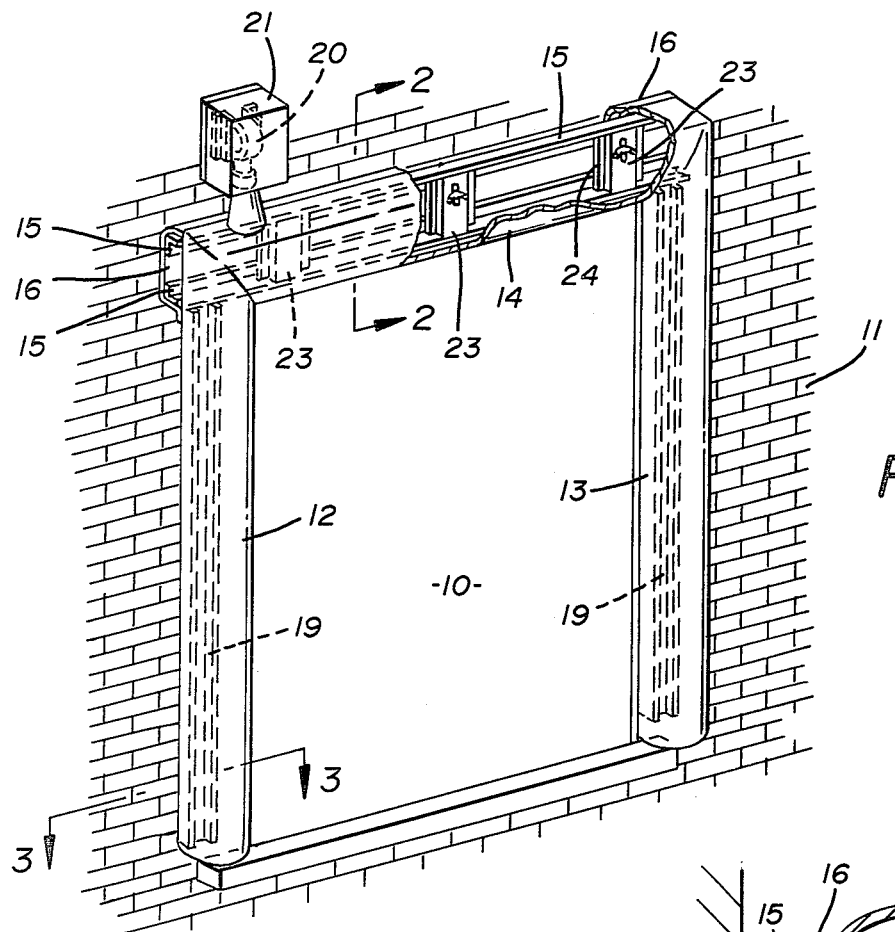
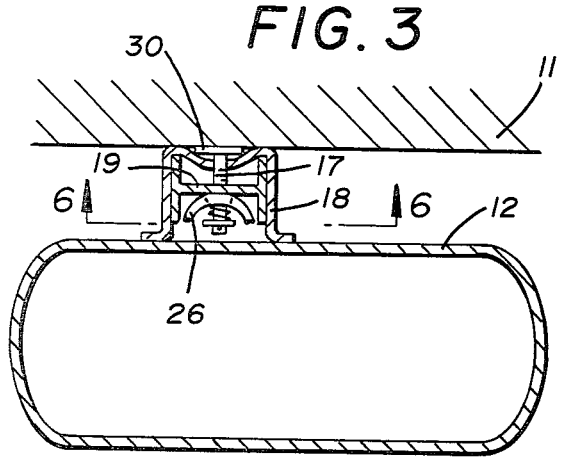
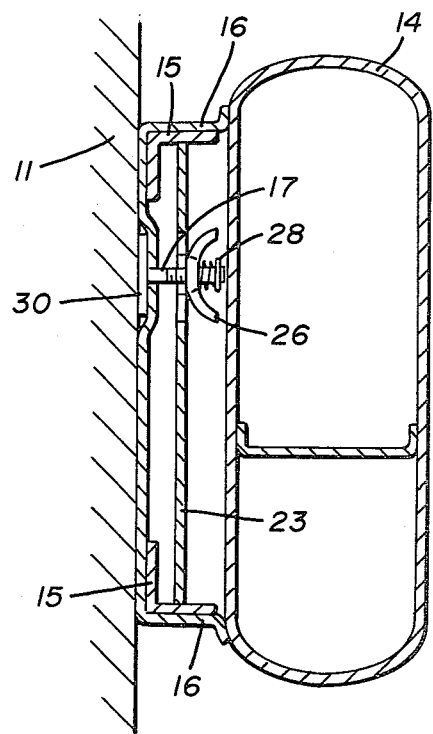

MOUNTING FOR INFLATABLE DOCK SEAL

BACKGROUND OF THE INVENTION

1. Field of the Invention:

This invention relates to devices for mounting an inflatable dock seal or the like on a wall around a dock opening therein.

2. Description of the Prior Art:

Prior dock seal structures have been mounted on or in an opening in a building against which a truck or a trailer is to be positioned so as to seal the same with respect thereto. My earlier U.S. Pat. Nos. 3,303,615; 3,391,502; 3,391,503; and 3,714,745 show such typical structures.

In each of these patents wooden members were affixed to the wall in or about the dock opening and the inflatable structure attached thereto. In my prior U.S. Pat. No. 4,045,925 an improved mounting is disclosed wherein uninflated flexible tubular members are formed on the inflatable portions of the dock seal at the sides thereof and structural members are engaged in the flexible tubular members and secured to the wall at their upper and lower ends. The upper transverse portion of the dock seal is secured to a wooden member which in turn was affixed to the building wall.

The present invention discloses an inflatable dock seal and an improved mounting construction incorporated therewith for mounting the same quickly and easily as compared with the constructions heretofore known in the art.

SUMMARY OF THE INVENTION

An inflatable dock seal comprising an inverted U-shaped inflatable member positioned around a dock opening in a building wall so as to seal a truck or trailer body with respect thereto is provided with uninflated flexible tubular members on its surfaces engagable against the wall about the dock opening. Structural members are disposed in the uninflated flexible tubular members and openings in the uninflated flexible tubular members are provided along with openings in the structural members so that fasteners affixed to the wall about the dock opening can be engaged through the openings and detachably secured to the structural members so as to quickly and easily mount the inflatable dock seal on the wall about the dock opening therein. The invention eliminates the wooden member or members which were heretofore used and which were expensive and time consuming both in mounting on the wall and in securing the dock seal thereto.

In the present invention fasteners such as bolts with spring loaded butterfly nuts thereon are positioned on the wall about the dock opening, structural members such as elongated aluminum extrusions are inserted in the elongated uninflated flexible tubular members on the dock seal and openings in the uninflated flexible tubular members and the structural members permit the same to be positioned directly over the bolts with the spring loaded butterfly nuts which are then turned a quarter turn to satisfactorily fasten the dock seal to the wall about the dock opening.

DESCRIPTION OF THE DRAWINGS

FIG. 1 is a perspective elevation of an inflatable dock seal and mounting with parts broken away and parts illustrated in broken lines;

FIG. 2 is an enlarged cross section one line 2—2 of FIG. 1;

FIG. 3 is an enlarged cross section one line 3—3 of FIG. 1;

DESCRIPTION OF THE PREFERRED EMBODIMENT

Figure 4:
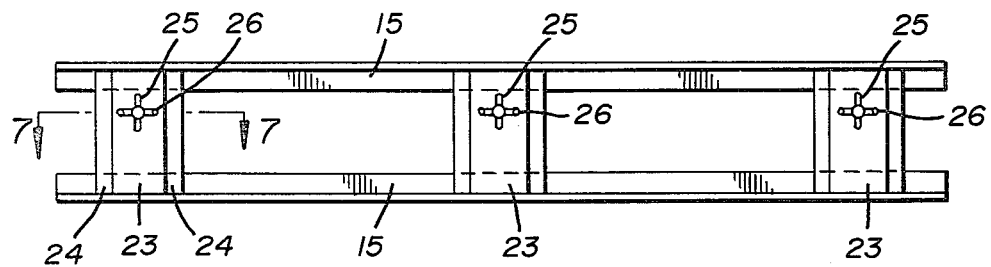
FIG. 4 is a plan view of a member seen in FIG. 1.

By referring to the drawings and FIG. 1 in particular, it will be seen that a loading dock opening 10 is located in a building wall 11 and provided with a pair of vertical inflatable members 12 and 13 at the sides thereof together with a horizontally disposed inflatable member 14 across the top thereof. A ladder-like structural member having rails 15 and cross pieces 23 is positioned in an elongated flexible channel member 16 attached to the rear surface of the horizontally disposed inflatable member 14 and fasteners 17 in or on the wall 11 as seen in FIGS. 2,3,5 and 6 of the drawings are engaged in openings in the cross pieces 23 of the structural member 15 so as to hold the same and the flexible channel member 16 and the horizontally disposed inflatable member 14 securely on the wall 11. The channel member 16 as attached to the inflatable member 14 forms one of the uninflated flexible tubular members herein before referred to.

Similar flexible channel members 18 are attached longitudinally to the rear sides of the vertical inflatable members 12 and 13 and additional structural members 19 such as cross sectionally H-shaped aluminum extrusions are disposed therein and they are engaged over additional fasteners 17 on or in the wall 11 as seen in FIG. 3 of the drawings so as to secure the vertical inflatable members 12 and 13 to the wall 11 at the sides of the dock opening 10.

Those skilled in the art will observe that the upper ends of the vertical inflatable members 12 and 13 may be and preferably are continuously joined with the horizontally disposed inflatable member 14, the lower ends of the inflatable members 12 and 13 are closed and air introduced into the inflatable members 12, 13 and 14 by a blower 20 preferably mounted in a housing 21 above the dock opening 10 delivers the air to the inflatable members 12, 13, and 14 by way of a tubular connection 22 as seen in FIG. 1 of the drawings.

By referring to FIG. 4 of the drawings, it will be seen that the rails 15 of the ladder-like member are spaced by the several cross pieces 23 which are channel shaped and provided with flanges 24 on their longitudinal edges. Slot like openings 25 are formed in the cross pieces 23 for the reception of the fasteners comprising the butterfly nuts 26 on the bolts 17. The arrangement is such that the ladder-like structural member is held in desirable relation in the assembly to insure the proper location of the horizontally disposed inflatable member 14.

Figure 5:
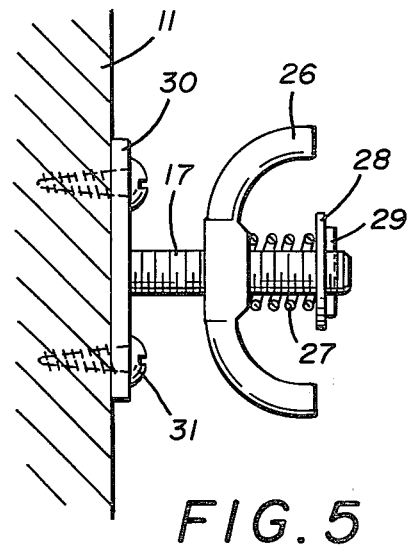
FIG. 5 is an enlarged detail of one of the fasteners seen in FIGS. 2 and 3 of the drawings.

By referring now to FIGS. 2,3,5 and 6 of the drawings, and FIG. 5 in particular, it will be seen that the fasteners 17 comprise threaded bolts with butterfly nuts 26 thereon tensioned by coil springs 27 positioned between the nuts 26 and the washers 28 which are in turn located on the bolts 17 by cotter pins 29 positioned through openings in the bolts. The bolts are secured in perpendicular relationship to mounting plates which in turn are apertured for the reception of screws or similar fasteners 31 which are engaged in the wall 11. Alternately the fasteners 17 may comprise bolts with screw end configurations for direct engagement in the wall 11 as will occur to those skilled in the art.

In FIGS. 2 and 3 of the drawings, the fasteners 17 are shown secured to the wall 11 and positioned through openings in the flexible channel members 16 and 18 respectively and engaged in openings in the members 19 and 23 respectively.

Figure 6:
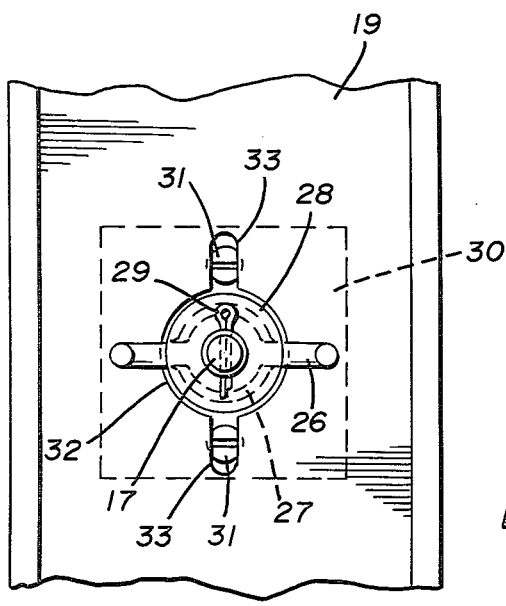
FIG. 6 is an enlarged detail taken on line 6—6 of FIG. 3.
Figure 7:
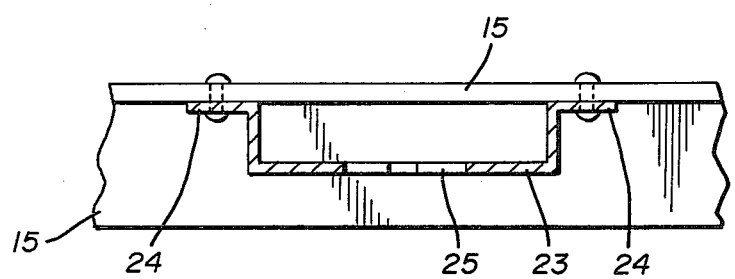
FIG. 7 is an enlarged cross sectional view on line 7—7 of FIG. 4.

In FIG. 6 one of the fasteners 17 on its mounting plate 30 is seen positioned through an opening 32 having vertically arranged slot extensions 33 as formed in the structural member 19. The butterfly nut 26 is initially positioned with its wings vertical position as seen in FIG. 5 of the drawings and in such position the fasteners 17 and the butterfly nuts 26 are positioned through the openings 32 and the slot extensions 33. The uninflated member 12 permits the butterfly nut 26 to be manually manipulated and turned to a horizontal position as shown in FIG. 2 where the wings of the butterfly nut will engage the structural member 19 at either side of the opening 32 and hold the assembly in desired position. The butterfly nut 26 will be retained in desired position by the tensioning of the spring 27 which is engaged thereagainst and against the washer 28 as heretofore described.

Each of the plurality of fasteners 17 is similarly positioned through appropriately positioned openings in the uninflated flexible channel members 16 and 18 and the inflatable dock seal is thus quickly and easily positioned on the wall about the dock opening 10. Actuation of the blower 20 inflating the inflatable members 12, 13 and 14 of the inflatable dock seal prevents further manipulation of the butterfly nuts 26 of the fasteners as they cannot be reached for manual manipulation when the members 12, 13 and 14 are inflated.

It will thus be seen that an improved mounting for an inflatable dock seal or the like has been disclosed which eliminates the heretofore costly and time consuming reliance on wooden or other frame-like mounting devices and achieves relatively inexpensive and fast labor saving mounting of a dock seal about a dock opening in a building wall or the like.

Although but one embodiment of the present invention has been illustrated and described, it will be apparent to those skilled in the art that various changes and modifications may be made therein without departing from the spirit of the invention and having thus described my invention what I claim is:

1. An inflatable dock seal and mounting therefor for positioning said dock seal on a wall above and beside a dock opening therein and comprising at least one inflatable member arranged in an inverted U-shape and having an upper horizontal section and a pair of spaced vertical sections, flexible non-inflatable longitudinally positioned channel-like fastening members on the exterior of each of said sections, said fastening members each being integral and U-shaped with the open side facing toward a corresponding section of said inflatable member and having out-turned flanges thereon, said flanges being continuously attached to said corresponding section of said inflatable member, rigid elongated structural members slidably positioned in each of said fastening members, a plurality of threaded bolt-like members positioned in said wall adjacent said dock opening and arranged for detachable engagement in a plurality of openings formed in said elongated structural members, butterfly nuts disposed on said bolt-like members and wherein said openings in said structural members are shaped to register with said butterfly nuts when in one position on said bolt-like members and means for inflating said inflatable member.

2. The inflatable dock seal and mounting therefor set forth in claim 1 and wherein said rigid elongated structural members have transversely flat portions in which said openings are formed.

3. The inflatable dock seal and mounting therefor set forth in claim 1 and wherein at least one of said rigid elongated structural members is a cross sectionally H-shaped member and said openings therein are formed in the web portion of said cross sectionally H-shaped member.

* * * * *